(12) United States Patent
Perello et al.

(10) Patent No.: US 9,062,143 B2
(45) Date of Patent: *Jun. 23, 2015

(54) WATER-REDISPERSIBLE POLYMER POWDER

(75) Inventors: Margarita Perello, Duebendorf (CH); Harmut Kühn, Halle (DE); Jürgen Dombrowski, Halle (DE); Francois M. Casati, Pfäffikon (CH); Etienne Lazarus, Marienthal (FR); Gerold Lohmüller, Baden-Baden (DE)

(73) Assignee: Dow Global Technologies LLC, Midland, MI (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/804,805

(22) Filed: Jul. 29, 2010

(65) Prior Publication Data

US 2012/0028064 A1    Feb. 2, 2012

Related U.S. Application Data

(63) Continuation of application No. PCT/US2009/030839, filed on Jan. 13, 2009.

(60) Provisional application No. 61/027,087, filed on Feb. 8, 2008.

(51) Int. Cl.
| | |
|---|---|
| C08L 25/08 | (2006.01) |
| C08L 29/04 | (2006.01) |
| C08F 236/10 | (2006.01) |
| C04B 24/26 | (2006.01) |
| C04B 28/02 | (2006.01) |
| C08F 212/08 | (2006.01) |
| D21H 17/36 | (2006.01) |
| C04B 103/00 | (2006.01) |
| C04B 111/00 | (2006.01) |
| D21H 17/37 | (2006.01) |
| D21H 19/20 | (2006.01) |
| D21H 19/58 | (2006.01) |
| D21H 19/60 | (2006.01) |

(52) U.S. Cl.
CPC ........... *C08F 236/10* (2013.01); *C04B 24/2641* (2013.01); *C04B 24/2688* (2013.01); *C04B 28/02* (2013.01); *C04B 2103/0057* (2013.01); *C04B 2111/00672* (2013.01); *C08F 212/08* (2013.01); *C08L 29/04* (2013.01); *D21H 17/36* (2013.01); *D21H 17/37* (2013.01); *D21H 19/20* (2013.01); *D21H 19/58* (2013.01); *D21H 19/60* (2013.01); *C08L 25/08* (2013.01)

(58) Field of Classification Search
CPC ...... C04B 14/06; C04B 24/00; C04B 24/383; C04B 24/2641; C04B 24/2688; C04B 25/08; C04B 28/02; C08F 2/24; C08F 212/08; C08F 236/10; C08L 25/08; C08L 29/04
USPC ........................................... 524/503; 525/57
See application file for complete search history.

(56) References Cited

U.S. PATENT DOCUMENTS

| | | | |
|---|---|---|---|
| 3,409,578 A | 11/1968 | Hwa | |
| 3,784,648 A | 1/1974 | Bergmeister et al. | |
| 3,822,230 A | 7/1974 | Nelson | |
| RE28,780 E | 4/1976 | Bergmeister et al. | |
| 4,049,590 A | 9/1977 | Falkenstein et al. | |
| 4,273,901 A | 6/1981 | Gibbs et al. | |
| 4,478,974 A | 10/1984 | Lee et al. | |
| 5,312,847 A | 5/1994 | de Vos | |
| 5,519,084 A | 5/1996 | Pak-Harvey et al. | |
| 5,576,378 A | 11/1996 | Kuhlmann et al. | |
| 5,872,189 A | 2/1999 | Bett et al. | |
| 5,922,796 A | 7/1999 | Colombet et al. | |
| 6,291,573 B1 * | 9/2001 | Pakusch et al. | 524/503 |
| 6,348,532 B1 | 2/2002 | Mayer | |
| 6,451,900 B1 | 9/2002 | Kuehn et al. | |
| 6,469,135 B2 | 10/2002 | Sandor et al. | |
| 6,590,022 B1 | 7/2003 | Bastelberger et al. | |
| 6,632,861 B1 | 10/2003 | Weitzel et al. | |
| 6,699,339 B2 | 3/2004 | Adler et al. | |
| 6,730,722 B1 | 5/2004 | Eck et al. | |
| 6,962,950 B1 | 11/2005 | Bastioli et al. | |
| 7,547,741 B2 | 6/2009 | Pakusch et al. | |
| 8,268,927 B2 * | 9/2012 | Baumann et al. | 525/56 |
| 2002/0062006 A1 | 5/2002 | Sandor et al. | |
| 2002/0120043 A1 | 8/2002 | Rothenhausser et al. | |
| 2003/0069337 A1 | 4/2003 | Gugumus | |
| 2003/0197151 A1 | 10/2003 | Gugumus | |
| 2004/0097622 A1 | 5/2004 | Weitzel | |
| 2004/0204518 A1 | 10/2004 | Harzschel et al. | |
| 2004/0241111 A1 | 12/2004 | Lazzari et al. | |
| 2007/0004834 A1 | 1/2007 | Pakusch et al. | |
| 2007/0037925 A1 * | 2/2007 | Weitzel et al. | 524/563 |
| 2007/0112117 A1 | 5/2007 | Weitzel | |
| 2007/0167539 A1 | 7/2007 | Pietsch et al. | |
| 2008/0132624 A1 | 6/2008 | Killat et al. | |
| 2009/0192242 A1 | 7/2009 | Willimann et al. | |

FOREIGN PATENT DOCUMENTS

| | | |
|---|---|---|
| DE | 2049114 | 4/1972 |
| DE | 19853420 A1 | 5/2000 |

(Continued)

OTHER PUBLICATIONS

European Search Report issued in EP 11161357.6, dated Jun. 7, 2011.

*Primary Examiner* — David W Wu
*Assistant Examiner* — Marie Reddick
(74) *Attorney, Agent, or Firm* — Andrew E. C. Merriam

(57) ABSTRACT

Polymer powders comprising in copolymerized form
a) one or more vinyl aromatic comonomers,
b) one or more 1,3-diene comonomers,
c) from 0.1 to 15 percent, based on the total comonomer weight, of one or more comonomers selected from the group consisting of ethylenically unsaturated mono- and dicarboxylic acids and their salts, wherein at least 75 percent of the total number of carboxylic groups present in the polymer are located at the surface of the polymer particles in the powder and at least 75 percent of the carboxylic groups located at the surface of the polymer particles in powder are present in their salt form, and
d) from 0 to 40 percent, based on the total comonomer weight, of one or more additional comonomers
have an excellent redispersibility in water.

6 Claims, No Drawings

(56) References Cited

FOREIGN PATENT DOCUMENTS

| | | |
|---|---|---|
| DE | 10040826 A1 | 3/2002 |
| DE | 10064083 A1 | 7/2002 |
| DE | 10322787 A1 | 12/2004 |
| EP | 0989154 A2 | 3/2000 |
| EP | 1065226 A1 | 1/2001 |
| EP | 1420001 A1 | 5/2004 |
| FR | 2861400 A1 | 4/2005 |
| GB | 1419833 | 12/1975 |
| JP | 2002069198 A | 3/2002 |
| JP | 2007524747 A | 8/2007 |
| WO | 9738042 A1 | 10/1997 |
| WO | 9948997 A1 | 9/1999 |
| WO | 0104212 A1 | 1/2001 |
| WO | 2005040253 A1 | 5/2005 |
| WO | 2005095495 A1 | 10/2005 |
| WO | 2009099717 A2 | 8/2009 |

* cited by examiner

WATER-REDISPERSIBLE POLYMER POWDER

CROSS REFERENCE TO RELATED APPLICATIONS

This application is a continuation of PCT/US2009/030839, filed 13 Jan. 2009, which claims the benefit of application Ser. No. 61/027,087, filed 8 Feb. 2008.

BACKGROUND OF THE INVENTION

The present invention concerns water-redispersible polymer powders, particularly water-redispersible powders wherein the polymer comprises in copolymerized form carboxylated copolymers of vinyl aromatic comonomers and 1,3-diene comonomers.

Water-redispersible powders made from the above-mentioned polymers and their use in the construction industry are generally known. Carboxylated vinyl aromatic-1,3-diene copolymers have many advantages, such as high flexibility, high adhesion to polar substrates and high adaptlity of the copolymer to the particular end-use by varying the ratio between the "hard" and "soft" comonomers, i.e. the vinyl aromatic comonomer and 1,3-diene comonomer.

U.S. Pat. No. 6,632,861 discloses self-leveling screeds and trowel-applied flooring compositions which contain a dispersion powder composition based on vinylaromatic-1,3-diene copolymers.

The polymer powders are typically produced by subjecting an aqueous dispersion of the polymer to a drying operation in which its volatile components are evaporated, for example by means of spray drying or freeze drying. The evaporation of the aqueous dispersion medium may be accompanied by irreversible aggregation of the polymer particles of the aqueous dispersion with one another, to form secondary particles. The formation of secondary particles results in poorer redispersibility, which is generally accompanied by poorer performance properties of the powder. Therefore, good redispersibility in water is one of the most important properties of the water-redispersible polymer powders. A large variety of spray-drying aids are used in the known processes of producing polymer powders to improve their water redispersibility.

WO 97/38042 relates to redispersible powders based the above-mentioned polymers. To achieve a good redispersibility of the polymer in water, spray-drying aids are added to the polymer suspension before spray-drying. The spray-drying aids are a blend of a salt of alkylated di-phenyl-ether-di-sulphonic acid, caseinate and/or N-alkysulfosuccinamide, and/or a di- or tetra-sodium or potassium salt of an addition product N-alkyl-sulphosuccinamate with maleic acid mixed with polyvinylalcohol.

European Patent No. 1,065,226 relates to a process of preparing redispersible powders based on the above-mentioned polymers wherein a hydroxycarboxylic acid or a salt thereof is added to an aqueous dispersion of an above-mentioned copolymer in an amount of 3-40 wt.-% of a hydroxycarboxylic acid or a salt thereof, based on the amount of the polymer, and the dispersion is dried.

U.S. Patent Application Publication No. 2007/0004834 discusses known spray-drying aids in the production of water-redispersible polymer powders as well as their disadvantages, particularly the formation of fissured films produced from these polymers or the strong smell of the produced polymer powders. The '834 Publication discloses the use of polyvinylformamide as a spray-drying aid to produce a polymer powder which is without odor or color, and exhibits effective redispersibility and filming.

In view of the wide variety of end-uses of water-redispersible polymers, evidently one single production method or one single spray-drying aid cannot satisfy all needs of the industry. Accordingly, one object of the present invention is to provide new water-redispersible polymer powders which comprise carboxylated copolymers of vinyl aromatic comonomers and 1,3-diene comonomers and processes for producing them. A preferred object of the present invention is to provide such water-redispersible polymer powders which exhibit a good water redispersibility. Another preferred object of the present invention is to provide such water-redispersible polymer powders which do not have a strong odor.

SUMMARY OF THE INVENTION

Surprisingly, it has been found that the above-mentioned object is achieved by new water-redispersible polymer powders which comprise carboxylated copolymers of vinyl aromatic comonomers and 1,3-diene comonomers which comprise a controlled distribution and degree of neutralization of the carboxylic groups.

One aspect of the present invention is a water-redispersible polymer powder which comprises in copolymerized form
a) one or more vinyl aromatic comonomers,
b) one or more 1,3-diene comonomers,
c) from 0.1 to 15 percent, based on the total comonomer weight, of one or more comonomers selected from the group consisting of ethylenically unsaturated mono- and dicarboxylic acids and their salts, wherein at least 75 percent of the total number of carboxylic groups present in the polymer are located at the surface of the polymer particles in the powder and at least 75 percent of the carboxylic groups located at the surface of the polymer particles in powder are present in their salt form, and
d) from 0 to 40 percent, based on the total comonomer weight, of one or more additional comonomers.

Another aspect of the present invention is a water-redispersible polymer powder which is a dried residue of an aqueous polymer dispersion comprising
i) a polymer comprising in copolymerized form a) one or more vinyl aromatic comonomers, b) one or more 1,3-diene comonomers, c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers, and
ii) at least 0.4 moles of a basic compound per mole of carboxylic groups in the polymer.

Yet another aspect of the present invention is a water-redispersible polymer powder which is a dried residue of an aqueous polymer dispersion of a polymer comprising
i) a polymer comprising in copolymerized form a) one or more vinyl aromatic comonomers, b) one or more 1,3-diene comonomers, c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers, and ii) a basic compound sufficient to adjust the pH of the dispersion to at least 8.5.

Yet another aspect of the present invention is a process for preparing a water-redispersible powder which comprises the steps of i) providing an aqueous dispersion of a polymer comprising in copolymerized form a) one or more vinyl aromatic comonomers, b) one or more 1,3-diene comonomers, c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers, ii) adjusting the pH of the dispersion to at least 8.5 and iii) drying the dispersion.

Yet another aspect of the present invention is a process for preparing a water-redispersible powder which comprises the steps of i) providing an aqueous dispersion of a polymer comprising in copolymerized form a) one or more vinyl aromatic comonomers, b) one or more 1,3-diene comonomers and c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers, ii) adding at least 0.4 moles of a basic compound per mole of carboxylic groups in the polymer before, during or after polymerization, and iii) drying the dispersion.

Yet another aspect of the present invention is the use of this water-redispersible polymer powder in the production of a polyurethane foam.

Yet another aspect of the present invention is a method of producing a polyurethane foam which comprises incorporating the water-redispersible polymer powder of the present invention in a polyurethane formulation.

Yet another aspect of the present invention is a polyurethane foam produced from:

A) a polyisocyanate,
B) a polyether polyol or polyester polyol,
C) a blowing agent,
D) one or more optional additives or auxiliary compounds, and
E) the water-redispersible polymer powder.

Yet another aspect of the present invention is the use of the water-redispersible polymer powder in combination with an inorganic binder in a product for the construction industry.

Yet another aspect of the present invention is a composition comprising an inorganic binder and the water-redispersible polymer powder of the present invention.

Yet another aspect of the present invention is the use of the water-redispersible polymer powder in a paper product, paperboard product, carpet backing, paint or coating or in a binder for wood, paper or textiles coatings or impregnating compositions.

DETAILED DESCRIPTION OF THE INVENTION

Examples of suitable vinylaromatic comonomers a) are styrene, alpha-methylstyrene, $C_1$-$C_4$ alkyl-styrenes such as o-vinyltoluene and tert-butylstyrene. Styrene is preferred. Examples of 1,3-dienes b) are 1,3-butadiene and isoprene, 1,3-butadiene being preferred.

Examples of suitable comonomers c) are ethylenically unsaturated mono- and dicarboxylic acids and their salts, particularly acrylic acid, methacrylic acid, fumaric acid, maleic acid and/or itaconic acid. Dicarboxylic acids or their salts, particularly itaconic acid, fumaric acid, their salts and combinations thereof, are preferred. It has been found that a redispersible polymer powder wherein the comonomer c) is a dicarboxylic acid or a salt thereof, particularly itaconic acid, fumaric acid, an itaconic acid salt or a fumaric acid salt, or a combination thereof has a better dispersibility than a comparable redispersible polymer powder which has been produced in the same way, but wherein the comonomer c) is a monocarboxylic acid.

It has been found that it is important to control the amount of carboxylic groups in the polymer that are located at the surface of the polymer particles in the powder and to control the amount of carboxylic groups that are present in their salt form in the polymer powder to achieve a good water redispersibility and a good odor control of the polymer powder. At least 75 percent, preferably at least 85 percent, more preferably at least 95 percent of the total number of carboxylic groups present in the polymer are located at the surface of the polymer particles in the powder and at least 75 percent, preferably at least 85 percent, more preferably at least 90 percent, and most preferably at least 95 percent of the carboxylic groups located at the surface of the polymer particles in the powder are present in their salt form.

The total amount of carboxylic groups in the polymer powder is determined in an aqueous dispersion of the polymer particles. The total molar amount of carboxylic groups is measured by swelling the polymer particles with a solvent enabling a strong basic compound, such as sodium hydroxide, to neutralize all acid groups present. The total acid titration is carried out using potentiometric titration. 2 g of moist polymer are diluted with water to a total volume of 20 ml. To stabilize the aqueous dispersion of the polymer for the pH range, 7.5 ml an oil-soluble surfactant solution, such as a solution of an octyl phenol ethoxylate in ethanol is added. To swell the polymer particles 7.5 ml of ethyl methyl ketone is added prior to the titration. The pH of the sample is adjusted to pH 2.5 using HCl (0.5 M). The titration is carried out with 0.5 M NaOH. The pH changes are recorded during titration and allow the determination of the neutralization equivalent points of the ethylenically unsaturated mono- or dicarboxylic acid used for polymerization. A first neutralization point is recorded when the previously added HCl and any strong acid groups potentially present in the aqueous dispersion are neutralized. A last neutralization point is recorded when all carboxylic groups originating from the ethylenically unsaturated mono- and dicarboxylic acids c) are neutralized. The total acid content of the sample can be calculated based on the difference of NaOH addition volume for the first equivalent point and the last equivalent point.

The sum of i) the molar amount of carboxylic groups located at the surface of the solid polymer particles and ii) the molar amount of carboxylic groups in the liquid phase of the aqueous dispersion, for example the carboxylic groups present in low molecular weight polymers that are dissolved in the aqueous phase, are separately measurable. The liquid phase of the aqueous polymer dispersion is typically called "serum" by the skilled artisans. Upon drying of the aqueous polymer dispersion, the carboxylic groups located in the serum deposit on the surface of the polymer particles. Accordingly, the percentage of the carboxylic groups that are located at the surface of the polymer particles in the powder, based on the total number of carboxylic groups present in the polymer, encompasses the amount of carboxylic groups located at the surface of the solid polymer particles and located in the liquid phase of the aqueous dispersion. The molar amount of carboxylic groups located at the surface of the polymer particles and in the serum is measured without swelling the polymer particles with a solvent enabling the strong basic compound, such as sodium hydroxide, to neutralize only the easily accessible acid groups. The surface and serum acid titration is carried out using potentiometric titration. 2 g of moist polymer is diluted with water to a total volume of 20 ml. The pH of the sample is adjusted to pH 2.5 using HCL (0.5 M). The titration is carried out with 0.5 M NaOH. The pH changes are recorded during titration and allow the determination of the neutralization equivalent points of the carboxylic acid groups located in the serum phase and on the surface of the polymer particles. A first neutralization point is recorded when the previously added HCl and any strong acid groups potentially present in the aqueous dispersion are neutralized. A last neutralization point is recorded when all carboxylic groups originating from the ethylenically unsaturated mono- and dicarboxylic acids c) are neutralized. The total acid content of the sample can be calculated based on the difference of NaOH addition volume for the first and last equivalent points.

The measured molar amount of carboxylic groups located at the surface of the solid polymer particles and in the liquid phase of the aqueous dispersion is divided by the measured total amount of carboxylic groups in the aqueous dispersion of the polymer particles to calculate the percentage of carboxylic groups that are located at the surface of the polymer powder.

A high percentage of the carboxylic groups located at the surface of the polymer particles in the powder can be obtained i) by the sole use of one or more ethylenically unsaturated dicarboxylic acid(s) as the comonomer c), such as fumaric or itaconic acid or combinations thereof, or ii) by staged monomer feeding, such as addition of the comonomer c) at an advanced stage of the polymerizations described further below, or iii) by conducting the polymerization at a pH described further below.

The percentage of the carboxylic groups that are present in their salt form and that are located at the surface of the polymer particles in the powder, based on the number of carboxylic groups that are located at the surface of the polymer particles in the powder, is determined by calculating the difference of NaOH quantities required to reach the first equivalent point and an aimed pH. This difference is then divided by the NaOH quantity required to neutralize all acid groups located at the surface of the polymer particles, as described above. This ratio represents the degree of acid groups neutralized at a given pH.

V1=Volume of NaOH to reach the first neutralization point
V2=Volume of NaOH to reach the last neutralization point
V3=Volume of NaOH to reach a given pH Percent neutralization: (V3−V1)/(V2−V1)*100.

Useful cations in the carboxylic acid salts are ammonium, alkali metal ions and alkaline earth metal ions. Preferred cations are the alkali metal ions, more preferably sodium or potassium, or the alkaline earth metal ions, more preferably calcium or magnesium.

Examples of optional comonomers d) are ethylenically unsaturated carboxamides and carbonitriles, preferably acrylamide, methacrylamide, acrylonitrile or methacrylonitrile; alkyl esters of acrylic acid or methacrylic acid, such as methyl acrylate, methyl methacrylate, n-butyl acrylate, n-butyl methacrylate, ethyl acrylate, ethyl methacrylate, or 2-ethylhexyl methacrylate, diesters of fumaric acid or maleic acid, such as the diethyl or diisopropyl esters, hydroxy alkyl acrylates or methacrylates, such as 2-hydroxy ethylacrylate; functional monomers such as sodium styrene sulfonate or sulfo ethylmethacrylate and sulfo propylmethacrylate. Other examples of optional comonomers d) are crosslinking comonomers, such as comonomers with two or more ethylenic unsaturations, such as divinyl benzene, divinyl adipates, diallyl maleate, allyl methacrylate or triallyl cyanurate, or postcrosslinking comonomers, such as acrylamidoglycolic acid (AGA), methyl methylacrylamidoglycolate (MAGME), N-methylolacrylamide (NMA), N-methylolmethacrylamide, allyl N-methylolcarbamate, alkyl ethers, such as isobutoxy ether, or esters of N-methylolacrylamide, of N-methylolmethacrylamide, or of allyl N-methylol-carbamate. Other suitable comonomers are epoxy-functional comonomers, such as glycidyl methacrylate and glycidyl acrylate. Other examples of comonomers are silicon-functional comonomers, such as acryloxypropyl-tri(alkoxy)- and methacryloxypropyltri(alkoxy)silanes, vinyltrialkoxysilanes and vinylmethyldialkoxysilanes, examples of alkoxy groups which may be present being ethoxy radicals and ethoxy(propylene glycol) ether radicals.

The polymer preferably comprises from 20 to 79.9 percent of comonomer a), from 20 to 79.9 percent of comonomer b), from 0.1 to 15 percent of comonomer c), and from 0 to 40 percent of comonomer d), based on the total weight of the copolymer. More preferably, the polymer comprises from 30 to 70 percent of comonomer a), from 20 to 60 percent of comonomer b), from 0.5 to 10 percent of comonomer c) and from 0 to 20 percent of comonomer d), based on the total weight of the copolymer. Most preferably, the polymer comprises from 50 to 70 percent of comonomer a), from 25 to 49 percent of comonomer b), and from 1 to 5 percent of comonomer c).

In another aspect of the invention the water-redispersible polymer powder is the dried residue of an aqueous polymer dispersion of a polymer comprising
i) a polymer comprising in copolymerized form a) one or more vinyl aromatic comonomers, b) one or more 1,3-diene comonomers, c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers, and iia) at least 0.4 moles, preferably from 0.5 to 2 moles, more preferably from 0.6 to 1.8 moles, most preferably from 0.7 to 1.5 moles of a basic compound per mole of carboxylic groups in the polymer, or iib) a basic compound sufficient to adjust the pH of the dispersion to at least 9.5, preferably at least 10.0, more preferably at least 10.5, and preferably up to 12.5, more preferably up to 12.0, most preferably up to 11.5.

The basic compound is preferably an inorganic basic compound, more preferably a strong inorganic basic compound, particularly an alkali metal hydroxide or an alkaline earth metal hydroxide, such as NaOH, KOH, LiOH, $Mg(OH)_2$ or Ca (OH)$_2$. Most preferably, the basic compound is alkali metal hydroxide, such as sodium hydroxide or potassium hydroxide.

Preferred comonomers a), b), c) and the optional comonomers d) are those described above.

Without wanting to be bound to the theory, applicants believe that the presence of an above-mentioned basic compound in an above-mentioned amount in the aqueous polymer dispersion converts the majority of the carboxylic acid groups or carboxylic acid anhydride groups in the polymer into the salt form of the acid groups. Applicants believe that at least 75 percent, more preferably at least 85 percent, most preferably at least 95 percent of the carboxylic acid groups or carboxylic acid anhydride groups which are present in the copolymer in the aqueous dispersion are converted to the salt form of the acid groups and remain in the salt form in the dried residue of an aqueous polymer dispersion.

The monomers and the proportions by weight of the comonomers are generally chosen so that, in general, a glass transition temperature Tg of from −60° C. to +80° C., preferably from −20° C. to +50° C., more preferably from −10° C. to +30° C. results. The glass transition temperature Tg of the polymers can be determined in a known manner by means of differential scanning calorimetry (DSC).

The copolymers can be prepared by an emulsion polymerization process or a suspension polymerization process, preferably by a emulsion polymerization process. The polymerization temperature is generally from 40° C. to 105° C., preferably from 60° C. to 95° C. The polymerization is typically initiated by means of water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide and azobisisobutyronitrile. Examples of monomer-soluble initiators are dicetyl peroxydicarbonate, dicyclohexyl peroxydicarbonate and dibenzoyl peroxide. The initiators mentioned are generally used in an amount of from 0.1 to 3% by weight, preferably from 0.2 to 2% by weight, in each case based on the total weight of the monomers.

As redox initiators the abovementioned initiators with reducing agents are useful. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.1 to 3% by weight, preferably from 0.1 to 2% by weight, in each case based on the total weight of the monomers.

To control the molecular weight, regulating substances (chain transfer agents) can be used during the polymerization. If regulators are used, they are usually employed in amounts of from 0.01 to 5.0% by weight, based on the monomers to be polymerized, and are metered in separately or after premixing with reaction components. Examples of such substances are n-dodecyl mercaptan, tert-dodecyl mercaptan, mercaptopropionic acid, methyl mercaptopropionate, isopropanol, acetaldehyde or dimeric alpha methylstyrene.

The polymerization process preferably takes place in the presence of one or more emulsifiers. In exceptional cases, it can also be advantageous to polymerize in the absence of emulsifiers. Appropriate amounts of emulsifiers are generally from 0.1 to 5% by weight, based on the amount of monomers. Suitable emulsifiers include anionic, cationic and nonionic emulsifiers, for example anionic surfactants such as alkyl sulfates having a chain length of from 8 to 18 carbon atoms, alkyl or alkyl aryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, alkylated diphenyl oxide sulfonate, esters and monoesters of sulfosuccinic acid with monohydric alcohols or alkylphenols, or nonionic surfactants such as alkyl polyglycol ethers or alkyl aryl polyglycol ethers having from 8 to 40 ethylene oxide units.

Protective colloids can be used instead of or in addition to one or more surfactants to stabilize the reaction mixture. Suitable protective colloids are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth) acrylates with carboxyl-functional comonomer units, poly (meth)acrylamide, polyvinylsulfonic acids and their water-soluble copolymers; melamine formaldehyde sulfonates, naphthaleneformaldehyde sulfonates, and styrene-maleic acid and vinyl ether-maleic acid copolymers.

All of the monomers may form an initial charge, or all of the monomers may form a feed, or portions of the monomers may form an initial charge and the remainder may form a feed after the polymerization has been initiated. The procedure is preferably that from 0 to 50% by weight, based on the total weight of the monomers, form an initial charge and the remainder forms a feed. The feeds may be separate (spatially and chronologically), or all or some of the components to be fed may be fed after preemulsification. When an ethylenically unsaturated monocarboxylic acid or a salt thereof is used as monomer c) in the polymerization process, it is preferably added at an advanced stage of the polymerization, preferably more than 60 percent, preferable more than 75 percent of the monomers have been polymerized. When an ethylenically unsaturated monocarboxylic acid or a salt thereof is used as monomer c) in the polymerization process, preferably the pH in the aqueous dispersion is from 3 to 9, more preferably from 4 to 8, most preferably from 6 to 7. This pH can be applied instead of or in addition to late addition of the monomer c).

After completion of the polymerization, an after-polymerization treatment can be carried out using known methods to remove residual monomer, in general by means of after-polymerization initiated by a redox catalyst. Volatile residual monomers can also be removed by means of distillation, preferably under reduced pressure and if desired while passing inert entrainer gases such as air, nitrogen or steam through or over the polymerization mixture. The aqueous dispersions obtainable in this way generally have a solids content of from 30 to 75% by weight, preferably from 40 to 60% by weight.

By the above described emulsion polymerization process or suspension polymerization process an aqueous dispersion of a polymer is prepared which comprises in copolymerized form a) one or more vinyl aromatic comonomers, b) one or more 1,3-diene comonomers, c) from 0.1 to 15 percent, based on the total comonomer weight, of one or more comonomers selected from the group consisting of ethylenically unsaturated mono- and dicarboxylic acids, their anhydrides, and their salts, wherein at least 75 percent of the total number of carboxylic groups present in the polymer are located at the surface of the polymer particles in the powder, and d) from 0 to 40 percent, based on the total comonomer weight, of one or more additional comonomers.

An above-described basic compound is added before, during or after polymerization to the starting composition for the aqueous polymer dispersion or to the aqueous polymer dispersion in an amount of at least 0.4 moles, preferably from 0.5 to 2 moles, more preferably from 0.6 to 1.8 moles, most preferably from 0.7 to 1.5 moles of a basic compound per mole of carboxylic groups in the polymer. Alternatively, an above-described basic compound is added in such an amount to adjust the pH of the aqueous polymer dispersion to at least 9.5, preferably at least 10.0, more preferably at least 10.5, and preferably up to 12.5, more preferably up to 12.0, most preferably up to 11.5.

It has surprisingly been found that the addition of a basic compound prior to drying the aqueous polymer dispersion substantially increases the water redispersibility of the polymer powder obtained upon drying the aqueous polymer dispersion. Moreover, it has surprisingly been found that a polymer powder comprising a carboxylated vinyl aromatic-1,3-diene obtained by drying the aqueous polymer dispersion exhibits a considerably lower smell if a basic compound has been added as described above than a comparable polymer powder to which no basic compound has been added prior to drying. In one embodiment of the invention, it has surprisingly been found that the redispersible polymer powder comprising a carboxylated vinyl aromatic-1,3-diene contains less volatile organic compounds, for example less odorous decomposition products of additives used in the polymerization process, such as chain transfer agents like dodecyl mercaptan. Without wanting to be bound by the theory, applicants believe to have found that the presence of the type and amount of basic compound described above has a stabilizing effect during the conditions applied in the spray-drying process, such as high temperatures.

In addition to the basic compound optional additives can be added prior to drying the aqueous dispersion, such as a spray-drying aid and/or an antifoaming agent. A spray-drying aid is generally used in a total amount of from 3 to 30% by weight, preferably from 5 to 20% by weight, based on the polymeric constituents of the dispersion. Preferred spray-drying aids are partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, styrene-maleic acid and vinyl ether-maleic acid copolymers, preferably a salt of alkylated di-phenyl-ether-di-sulphonic acid, N-alkylsulfosuccinamide, and/or a di- or tetra-sodium or potassium salt of an addition product of N-alkyl-sulphosuccinamate with maleic acid.

A content of up to 1.5% by weight of antifoam, based on the weight of the polymer particles, can be advantageous during spray-drying.

The viscosity of the feed to be spray-dried is preferably adjusted via the solids content so that a value of less than 1000 mPas (Brookfield viscosity at 20 revolutions and 23° C.), preferably less than 250 mPas, is obtained. The solids content of the dispersion to be spray-dried is generally 30 to 75% by weight, preferably from 40 to 60% by weight, based on the total weight of the dispersion.

To prepare the water-redispersible polymer powders, the aqueous dispersions are dried, for example by means of fluidized-bed drying, freeze drying or spray drying. The dispersions are preferably spray dried. Spray drying can be carried out in customary spray drying plants, with atomization being able to be carried out by means of single-fluid, two-fluid or multifluid nozzles or a rotary disc atomizer. In general, air, nitrogen or nitrogen enriched air is employed as the drying gas, the inlet temperature of the drying gas typically not exceeding 200° C. This inlet temperature preferably is from 110 to 180° C., more preferably from 140 to 170° C. The outlet temperature is generally set in the range from 45° C. to 120° C., preferably from 60° C. to 90° C., depending on the plant, the Tg of the resin and the desired degree of drying.

An anticaking agent (antiblocking agent) may be added to the polymer powder to increase storage stability, for example in order to prevent caking and blocking and/or to improve the flow properties of the powder. This addition is preferably carried out as long as the powder is still finely dispersed, for example still suspended in the drying gas. The anticaking agent is preferably of mineral origin. It is preferably added in an amount of up to 30% by weight, based on the total weight of polymeric constituents. Examples of anticaking agents include but are not limited to kaolin, calcium carbonate, magnesium carbonate, talc, gypsum, silica and silicates. The particle sizes of the anticaking agents are preferably in the range of from 10 nm to 10 μm. A preferred anticaking agent is kaolin. The amount of the anticaking preferably is from 3 to 20 percent, more preferably from 10 to 15 percent, based on the total powder quantity.

In a preferred embodiment of the present invention the redispersible polymer powder further comprises a protective colloid or an anticaking agent, more preferably it comprises both. It is understood that more than one protective colloid and more than one anticaking agent may be used.

The X50 size of the particle size distribution of the redispersible powder depends on drying conditions and drying equipment. X50 represents the median diameter in mm, which means that 50% by weight of the particles are smaller than this diameter. The produced water-redispersible polymer powder preferably has an X50 particle size diameter of from 5 to 100 micrometers, preferably from 20 to 90 micrometers, most preferably from 50 to 80 micrometers. The particle size distribution of the powder can be measured by laser diffraction using a particle size analyzer "Sympatec Helos" at a measuring range of 1,8-350 μM and dispersing the powder by compressed air.

The weight of the polymer particles in the powder, i.e., the carboxylated copolymer of vinyl aromatic comonomer and 1,3-diene comonomer described herein in the powder, is generally at least 50 percent, preferably at least percent, more preferably at least 70 percent of the total weight of the water-redispersible polymer powder and is generally up to 95 percent, preferably up to 85 percent, more preferably up to 80 percent of the total weight of the water-redispersible polymer powder.

The water-redispersible polymer powders of the present invention have a variety of uses. A preferred use relates to the production of polyurethane foams. It has been found that the hardness or flexibility of the polyurethane foam can be adjusted by incorporating the redispersible polymer powder of the present invention in the polyurethane formulation. It has been found that the presence of the water redispersible polymer powder of the present invention in a polyurethane formulation has a softening effect on the polyurethane foam produced from such formulation. The powder is easy to handle and can be easily shipped in bags. Its amount is not limited as in the case of a latex wherein the amount of water in the latex is the limiting factor for incorporating the latex in the polyurethane foam formulation. It has also been surprisingly found that redispersible polymer powders can act as a co-catalyst in the production of a polyurethane foam. This allows a reduction of the amount of catalyst used for producing polyurethane foams. Many organometallic catalysts, such as stannous octoate, tend to emit volatile organic compounds by releasing their acid upon foam aging. Hence a reduction of their use is beneficial for ecological reasons.

Accordingly, another aspect of the present invention is a polyurethane foam produced from:
A) a polyisocyanate,
B) a polyether polyol or polyester polyol,
C) a blowing agent,
D) one or more optional additives or auxiliary compounds, and
E) the water-redispersible polymer powder of the present invention or produced according to a process of the present invention.

The applications for polyurethane foams of the present invention are those known in the industry. Flexible and semi-flexible foams find use in applications such as bedding, furniture, automobile seats, sun visors, armrests, door panels, noise and heat insulation.

The polyisocyanates A) which may be used in the present invention include aliphatic, cycloaliphatic, arylaliphatic and aromatic polyisocyanates having at least 2 isocyanate groups. For the production of flexible slabstock foam, aromatic polyisocyanates are preferred. Examples of suitable aromatic polyisocyanates include the 4,4'-, 2,4' and 2,2'-isomers of diphenylmethane diisocyanate (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether. Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. MDI or TDI based prepolymers made with a polyol can also be used. Isocyanate-terminated prepolymers are prepared by reacting an excess of polyisocyanate with polyols, including aminated polyols or imines/enamines thereof, or polyamines. Examples of aliphatic polyisocyanates include ethylene diisocyanate, 1,6-hexamethylene diisocyanate (HDI), isophorone diisocyanate (IPDI), cyclohexane 1,4-diisocyanate, 4,4'-dicyclohexylmethane diisocyanate ($H_{12}$MDI), saturated analogues of the above mentioned aromatic isocyanates and mixtures thereof. The preferred polyisocyanates are the toluene-2,4- and 2,6-diisocyanates or MDI or combinations of TDI/MDI or prepolymers made therefrom.

Polyether or polyester polyols B) are those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups or at least two amine groups per molecule are especially preferred due to their desirable reactivity with polyisocyanates. Polyether polyols based on the polymerization of alkylene oxides, and/or polyester polyols, are the major components of a polyurethane system together with isocyanates. Polyols can also be filled polyols, such as SAN (Styrene/Acrylonitrile), PIPA (polyisocyanate polyaddition) or PHD (polyurea) polyols.

Suitable polyols (B) that can be used to produce polyurethane foams of the present invention are well known in the art and include those described herein and any other commercially available polyol and/or SAN, PIPA or PHD copolymer polyols. Such polyols are described in "Polyurethane Handbook", by G. Oertel, Hanser publishers. Mixtures of one or more polyols and/or one or more copolymer polyols may also be used to produce polyurethane products according to the present invention.

Representative polyols include polyether polyols, polyester polyols, polyhydroxy-terminated acetal resins, hydroxyl-terminated amines and polyamines. Natural oil based polyols can also be used. Examples of these and other suitable isocyanate-reactive materials are described more fully in U.S. Pat. No. 4,394,491. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator or blend of initiators to give a final polyol a nominal functionality having from 2 to 8, preferably 2 to 6, more preferably 2.1 to 4 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate, or quaternary phosphazenium compounds. In the case of alkaline catalysts, these are eliminated from the polyol at the end of production by a proper finishing step, such as coalescence, magnesium silicate (magsil) separation, ion exchange or less preferably by acid neutralization. In the case of DMC catalyst produced polyols, the finishing step can be avoided.

The polyols or blends thereof employed depend upon the end use of the polyurethane foam to be produced. The hydroxyl number and molecular weight of the polyol or polyols employed can vary accordingly over a wide range. In general, the hydroxyl number of the polyols employed for use in producing a foam may range from 15 to 400.

In the production of a flexible polyurethane foam, the polyol is preferably a polyether polyol and/or a polyester polyol or a polyetherester polyol. The polyol generally has an average functionality ranging from 2 to 5, preferably 2 to 4, and an average hydroxyl number ranging from 15 to 300 mg KOH/g, preferably from 20 to 200, and more preferably from 20 to 100 mg KOH/g. As a further refinement, the specific foam application will likewise influence the choice of base polyol. As an example, for flexible molded foam, the hydroxyl number of the base polyol may be on the order of 20 to 60 with ethylene oxide (EO) capping, and for flexible slabstock foams the hydroxyl number may be on the order of 25 to 75 and is either mixed feed EO/PO (propylene oxide) or is only slightly capped with EO or is 100 percent PO based.

High resilience flexible slabstock (HR slabstock) foam is made in methods similar to those used to make conventional flexible slabstock foam but using higher equivalent weight polyols. HR flexible slabstock foams are characterized in exhibiting a ball rebound score of at least 40 percent measured according to the procedures of ASTM 3574.93. Water levels generally are from about 2 to about 6, especially from about 3 to about 5 parts per 100 parts by weight of polyols.

The initiators for the production of polyols (B) generally have 2 to 8 functional groups that will react with the alkylene oxide and do not contain nitrogen. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof.

All or part of polyols of (B) can also be based on or derived from renewable resources such as natural and/or genetically modified (GMO) plant vegetable seed oils and/or animal source fats. Examples of preferred vegetable oils include, for example, those from castor, soybean, olive, peanut, rapeseed, corn, sesame, cotton, canola, safflower, linseed, palm, sunflower seed oils, or a combination thereof. Preferably sources or renewable polyols are derived from soybean and/or castor and/or canola oils.

For use in the production of flexible polyurethane foam it is generally desirable to modify the natural materials to give the material isocyanate reactive groups or to increase the number of isocyanate reactive groups on the material. Preferably such reactive groups are a hydroxyl group. Such modifications of a renewable resource include, for example, epoxidation, as described in U.S. Pat. No. 6,107,433 or in U.S. Pat. No. 6,121,398; hydroxylation, such as described in WO 2003/029182; esterification such as described in U.S. Pat. No. 6,897,283; 6,962,636 or 6,979,477; hydroformylation as described in WO 2004/096744; grafting such as described in U.S. Pat. No. 4,640,801; or alkoxylation as described in U.S. Pat. No. 4,534,907 or in WO 2004/020497. The above cited references for modifying the natural products are incorporated herein by reference. After the production of such polyols by modification of the natural oils, the modified products may be further alkoxylated. The use of EO or mixtures of EO with other oxides, introduce hydrophilic moieties into the polyol.

A natural oil based polyols may also be obtained by a combination of the above modification techniques as disclosed in PCT Publications WO 2004/096882 and 2004/096883, and Applicant's copending application Ser. No. 60/676,348 entitled "Polyester Polyols Containing Secondary alcohol Groups and Their Use in Making Polyurethanes Such as Flexible Polyurethane Foams", the disclosures of which are incorporated herein by reference.

Polyols pre-reacted with polyisocyanates can also be used in the polyurethane formulation. Isocyanate prepolymers can be prepared with standard equipment, using conventional methods, such as heating the polyol in a reactor and adding slowly the isocyanate under stirring.

For producing a polyurethane-based foam, a blowing agent C) is generally required. In the production of flexible polyurethane foams, water is preferred as the blowing agent. The amount of water is preferably in the range of from 0.5 to 10 parts by weight, more preferably from 2 to 7 parts by weight based on 100 parts by weight of the polyol and even more preferably the water is between 2 and 5 parts per hundred parts polyol. In some applications the water is preferably present at 3 parts or more by weight of the polyol. In some preferred embodiment, the water is present at 6 parts or less by weight of the polyol. Although not preferred, other blowing agents can be liquid or gaseous carbon dioxide, methylene chloride, acetone, pentane, isopentane, cyclopentane, methylal or dimethoxymethane, dimethylcarbonate. Use of artificially reduced, or increased, atmospheric pressure, such as disclosed in U.S. Pat. No. 5,194,453, or frothing, can also be contemplated with the present invention.

An essential component for producing the polyurethane foam of the present invention is the redispersible polymer powder (E) as described in detail above. The water-redispersible polymer powder is preferably incorporated in the reaction mixture for producing the polyurethane foam of the present invention in an amount of from about 0.1 to about 40, preferably from about 0.5 to about 20, more preferably from about 1 to about 15 parts by weight per one hundred parts of the polyether polyol or polyester polyol.

In addition to the foregoing critical components, it is often desirable to employ one or more optional additives or auxiliary compounds D) in preparing polyurethane polymers. Among these optional additives or auxiliary compounds D) are catalysts, cross-linkers, chain extenders, cell regulators, stabilizers, flame retardant additives surfactants, preservatives, flame retardants, colorants, antioxidants, reinforcing agents, stabilizers and fillers, or recycled polyurethane powder. Such auxiliary compounds D) are known in the art. The use of crosslinking agents or chain extenders is, for example, known from U.S. Pat. Nos. 4,863,979, 4,883,825 and 4,963,399 and EP 549,120.

One or more catalysts for the reaction of the polyol with the polyisocyanate can be used. Any suitable urethane catalyst may be used, including tertiary amine compounds, amines with isocyanate reactive groups and organometallic compounds. Exemplary tertiary amine catalysts include triethylenediamine; N-methylmorpholine; N,N-dimethylcyclohexylamine; pentamethyldiethylenetriamine; tetramethylethylenediamine; bis (dimethylaminoethyl)ether; 1-methyl-4-dimethylaminoethyl-piperazine; 3-methoxy-N-dimethylpropylamine; N-ethylmorpholine; dimethylethanolamine; N-cocomorpholine; N,N-dimethyl-N',N'-dimethyl isopropylpropylenediamine; N,N-diethyl-3-diethylaminopropylamine and dimethylbenzylamine. Exemplary organometallic catalysts include organobismuth, organomercury, organolead, organoferric and organotin catalysts, with organotin catalysts being preferred among these. Suitable tin catalysts include stannous chloride, tin salts of carboxylic acids such as dibutyltin di-laurate, and stannous octoate, as well as other organometallic compounds such as are disclosed in U.S. Pat. No. 2,846,408. A preferred organobismuth catalyst is bismuth neodecanoate sold by Air Products as DABCO™MB 20. A catalyst for the trimerization of polyisocyanates, resulting in a polyisocyanurate, such as an alkali metal alkoxide may also optionally be employed herein. The amount of amine catalyst can generally vary from 0.02 to 5 percent in the formulation. The amount of organometallic catalyst can generally vary from 0.001 to 1 percent in the formulation. Autocatalytic polyols such as those claimed in WO 01/58976 or US Pat. No. 5,476,969 can be used in the polyurethane foam of the present invention.

It has surprisingly been found that the redispersible polymer powder can act as a co-catalyst in the production of a polyurethane foam. This generally allows the reduction of the amount of catalyst that is typically used in the production of a polyurethane foam in the absence of a redispersible polymer powder. Many organometallic catalysts, such as stannous octoate, tend to emit volatile organic compounds. A reduction of their use may be beneficial for ecological reasons.

Processes for producing polyurethane products are well known in the art. In general components of the polyurethane-forming reaction mixture may be mixed together in any convenient manner, for example by using any of the mixing equipment described in the prior art for the purpose such as described in "Polyurethane Handbook", by G. Oertel, Hanser publisher. The redispersible polymer powder can be added as a powder to the reaction mixture comprising A) a polyisocyanate, B) a polyether polyol or polyester polyol, C) a blowing agent, and D) optionally one or more additives or auxiliary compounds, before the reaction mixture is processed into a flexible polyurethane foam. However, preferably the redispersible polymer powder is pre-dispersed in at least one of the components A) to D) before components A), B), C) and optionally D) are mixed. More preferably, the redispersible polymer powder E) is pre-dispersed in the polyether polyol or polyester polyol. The resulting foams are typically from about 10 kg/m$^3$ to a maximum of 80 kg/m$^3$. A preferred range is from about 10 kg/m$^3$ to 60 kg/m$^3$ and more preferably from about 10 kg/m$^3$ to 50 kg/m$^3$ in density. In an even more preferred embodiment the flexible slabstock foam has a density of 40 kg/m$^3$ or less.

In another preferred aspect of the present invention the water-redispersible polymer powder of the present invention is used in combination with an inorganic binder in products for the construction industry. More preferably, the water-redispersible polymer powder is used an additive in a setting composition further comprising an inorganic hydraulic binder. Examples of inorganic binders include cements, such as Portland cement, alumina cement, pozzolanic cement, slag cement, magnesia cement and phosphate cement; gypsum hemihydrate and water-glass. Illustrative uses of the polymer composition according to the present invention are in tile adhesives, construction adhesives, renders, joint mortars, plasters, troweling compositions, filling compositions, such as floor filling compositions (e.g. self-leveling flooring compounds), concrete repair joints, and joint mortars. In particular, the use of the water-redispersible polymer powder described herein in setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition. A preferred use of the water-redispersible polymer power is in tile adhesives, more preferred cement-based tile adhesives. Cement-based tile adhesives typically comprise 5 to 50 parts by weight of cement, preferably Portland cement, as the hydraulic binder; 40 to 70 parts by weight of quartz sand, preferably having a particle size of from 0.1 to 0.5 mm, as the main filler and 0.1 to 10% by weight, preferably 1 to 6% by weight (based on the dry weight of the tile adhesive) of the redispersible polymer powder according to the present invention. Further optional components include one or more cellulose ethers (preferably in a total amount of 0.05 to 1% by weight, more preferably 0.2 to 0.5% by weight, based on the dry weight of the tile adhesive) to control rheology, water retention, slip resistance and improved workability; quartz or lime stone powder having a particle size of from 30 to 60 μm as fine co-filler to improve consistency and workability; and cellulose or mineral fibers to improve the slip resistance.

Another preferred use of the water-redispersible polymer power is in external thermal insulation systems ETICS, particularly as an adhesive on the thermally insulating board layer to reduce the water absorption and improve the impact resistance of the external thermal insulation system. ETICS is a multi component system that comprises an insulation panel which is fixed to the outside of buildings. Water redispersible polymer powders are binders in dry-mix mortar formulations which make sure that the mineral based mortar binds to the surface of the insulation panel, which typically is made from an expanded polystyrene (EPS).

Another preferred use of the water-redispersible polymer powders is in self-leveling flooring compounds SLFC. The powders are added to improve the adhesion to the substrate, the flexibility, the abrasion resistance and the aging properties.

Furthermore, the water-redispersible polymer powder according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the water-redispersible polymer powder may be used as the sole binder in coating compositions and adhesives.

Depending on their end-use, it may be advantageous to use the water-redispersible polymer powder in combination with one or more known water-redispersible polymer powders, such as homopolymer or copolymer of one or more "principle" monomers from the group consisting of vinyl esters of unbranched or branched alkylcarboxylic acids having from 1 to 15 carbon atoms, methacrylic esters and acrylic esters of alcohols having from 1 to 15 carbon atoms, olefins, and vinyl halides.

While principles of the invention are amenable to various modifications and alternatives forms, particular species have been described. It should be understood that the intent of this description is not to limit the invention to the particular embodiments described, but rather to cover all modifications, equivalents, and alternatives falling within the spirit and scope of the disclosure. Use of the terms "comprising", "comprises" and variations thereof are intended to be open-ended. Thus, elements, steps or features not expressly listed or described are not excluded.

The following examples are provided for illustrative purposes only and are not intended to limit the scope of the claims that follow. Unless otherwise indicated, all parts and percentages are by weight.

EXAMPLES

Preparation of Aqueous Dispersion

An aqueous dispersion of a carboxylated styrene/butadiene copolymer is prepared according to the procedure generally described above. The production of an aqueous dispersion of a carboxylated styrene/butadiene copolymer is known in the art. 100 parts of comonomers (styrene, 1,3-butadiene and ethylenically unsaturated carboxylic acid), about 100 parts of water, 0.8 parts of sodium peroxodisulfuric acid (iniator), 0.02 parts of the trisodium salt of N-(hydroxyethyl)-ethylene-diaminetriacetic acid (chelating agent, 40% active), 0.5 parts of alkyldiphenyloxide disulfonate surfactant (45% active), 0.07 parts of sodium hydroxide and 0.67 parts of t-dodecyl mercaptane (chain transfer agent) are included in the polymerization mixture.

The composition of the carboxylated styrene/butadiene copolymer is listed in Table 1 below. The percentages are based on total comonomer content.

TABLE 1

| Polymer type | Styrene (%) | 1,3-butadiene (%) | comonomer c) | % acid on surface** | Tg (° C.) |
|---|---|---|---|---|---|
| I | 57 | 40 | 3% itaconic acid | 97 | −4 |
| II | 67 | 30 | 3% itaconic acid | 97 | 20 |
| III | 62 | 36 | 2% itaconic acid | 96 | 5 |
| IV | 62 | 35 | 3% itaconic acid | 97 | 8 |
| V | 62 | 35 | 3% itaconic acid | 98 | 7.5 |
| Comparison* | 65 | 30 | 1% fumaric acid + 3% acrylic acid | 69 | 20 |

*Comparison
**Percentage of the total number of carboxylic groups located at the surface of the polymer particles, includes carboxylic groups in liquid phase of polymer dispersion Spray-Drying of Polymer Dispersion To each polymer dispersion sodium hydroxide is added in the amount listed in Table 2 below. The pH of the aqueous dispersion is measured. An aqueous solution of polyvinyl alcohol in water is added as a spray-drying aid to each of the aqueous polymer dispersions, such that the amount of the polyvinyl alcohol is 10% by weight, based on the polymer weight. The polyvinyl alcohol has a degree of hydrolysis of 88 mole % and a Hoeppler viscosity of 4 mPa·s, measured as a 4 weight % aqueous solution at 20° C. according to DIN 53015. Tetrasodium N-(1,2-dicarboxyethyl)-N-octadecyl sulfosuccinamate, commercially available under the trademark AEROSOL™22 urfactant is added to some of the dispersions, as indicated in Table 2. The blend of polymer dispersion, sodium hydroxide, polyvinyl alcohol and optionally AEROSOL™22 surfactant is then spray-dried. The drying temperature is 130° C. The product outlet temperature is 55° C. 12% by weight kaolin are added as an anti-caking agent during the drying process, based on the weight of the polymer. The powder and the drying air are separated in a cyclone.

Measurement of Redispersibility

Redispersibility of the powder is measured by preparing a 1:1 mixture of water and polymer powder are stirring it intensively during 30 min at room temperature. 5 g of the final redispersion is mixed with 45 g water and filled into a graduated glass tube with a diameter of 1 cm. The redispersibility is characterized by the sedimentation of large and not re-dispersed particles of the diluted redispersion. The height of the sedimentation in the glass tube is measured in millimeters after 1 hour and 24 hours respectively. The lower the height of the sediment is, the better is the redispersibility of the powder. The results are listed in Table 2 below.

A description of the raw materials used in the examples is as follows.

Table 2 illustrates that the water-redispersible polymer powder of the present invention which is based on a carboxylated copolymer of a vinyl aromatic comonomer and 1,3-diene comonomer wherein at least 75 percent of the total number of carboxylic groups that are present in the polymer are located at the surface of the polymer particles in the powder exhibit a considerably better redispersibility, i.e. considerably less sedimentation, than a water-redispersible polymer which is based on a comparable carboxylated copolymer of a vinyl aromatic comonomer and 1,3-diene comonomer, but wherein less than 75 percent of the total number of carboxylic groups that are present in the polymer are located at the surface of the polymer particles in the powder.

Measurement of Volatile Organic Compounds (VOC)

Samples are analyzed by headspace gas chromatography (GC)/flame ionization detector (FID) at a headspace temperature of 120° C. and an equilibration time of 2 hours. Sample preparation: 150 mg of the redispersible polymer powder is weighed into a 22 mL headspace vial. The vial is sealed and run under the described conditions. Standard preparation: A standard containing 942 mg/L of n-dodecane and 4-cyanocyclohexene in iso-octane is prepared. 2 Microliter of this solution are added into a headspace vial and run under the described conditions (120° C. for two hours). Calibration: The response obtained for n-dodecane is used for the calculation of the alkane/alkene decomposition products. The area sum of the peaks appearing between 4-cyanocyclohexene and n-dodecane in the sample chromatograms is defined as the alkane/alkene decomposition products.

Table 3 below illustrates that the water-redispersible polymer powder of the present invention which is based on a carboxylated copolymer of a vinyl aromatic comonomer and 1,3-diene comonomer wherein at least 75 percent of the carboxylic groups located at the surface of the polymer particles in the powder are present in salt form releases considerably less volatile organic compounds and/or releases considerably less odorous compounds than a comparable carboxylated copolymer of a vinyl aromatic comonomer and 1,3-diene comonomer wherein less than 75 percent of the carboxylic

TABLE 2

| (Comparative) Example | Polymer type | AEROSOL 22 wt. % | pH | % neutralization* | added NaOH per mole carboxylic group (mols) | Redispersibility After 1 h (mm) | Redispersibility After 24 h (mm) |
|---|---|---|---|---|---|---|---|
| 1 | IV | 2 | 9 | 82 | 0.55 | 2 | 4.5 |
| 2 | IV | — | 9 | 82 | 0.55 | <1 | 6 |
| B** | Comp. | 2 | 9 | 82 | 0.55 | 2 | 16 |
| C** | Comp. | — | 9 | 82 | 0.55 | 3.5 | 18 |
| 3 | III | 2 | 9 | 82 | 0.55 | 2 | 9 |
| 4 | III | — | 9 | 82 | 0.55 | 3.5 | 16 |
| D** | III | 2 | 6.4 | 34 | 0.16 | 2 | 20 |
| E** | III | 2 | 7.7 | 57 | 0.35 | 2 | 20 |
| 5 | III | 2 | 8.8 | 76 | 0.52 | 1 | 10 |
| 6 | III | 2 | 9.7 | 90 | 0.60 | 1 | 7 |
| 7 | III | 2 | 11.5 | 100 | 0.67 | 1 | 5.5 |
| 8 | V | — | 11.3 | 100 | 0.65 | 1.5 | 13 |
| 9 | V | 2 | 11.3 | 100 | 0.65 | 1.5 | 6 |
| 10 | I | — | 11.3 | 100 | 0.65 | 1.0 | 3 |
| 11 | I | 2 | 11.3 | 100 | 0.65 | 1.0 | 2.5 |
| 12 | II | — | 11.3 | 100 | 0.65 | 1.0 | 5 |
| 13 | II | 2 | 11.3 | 100 | 0.65 | 1.0 | 7 |

*Percent of the carboxylic groups located at the surface of the polymer particles in the powder that are present in their salt form
**Comparative Data groups located at the surface of the polymer particles in the powder are present in salt form.

TABLE 3

| Example | Polymer type | AEROSOL 22 Wt % | pH | % neutralization* | Total VOC (ppm) | alkane/alkene decomposition products [ppm] |
|---|---|---|---|---|---|---|
| E** | 3 | 2 | 7.7 | 57 | 120 | 69 |
| 5 | 3 | 2 | 8.8 | 76 | 82 | 50 |
| 7 | 3 | 2 | 11.5 | 90 | 61 | 34 |

**Comparative Data

CFD Hardness is measured in KPa at 50% compression. The Peugeot method D-41-1003-86 is used for this Compression Force Deflection (CFD).

All free rise foams are made in the laboratory by preblending in a plastic cup water-redispersible polymer powder, polyol, surfactant, catalyst and water, conditioned at about 25° C. Components are stirred at about 2000 RPM for 30 seconds before the isocyanate is added (also conditioned at about 25° C.) and mixed for another 5 seconds. Reactants are then poured in a 20×20×20 cm cardboard box and let rise freely. After cooling and curing for 24 hours at room temperature the foam is removed from the cardboard box and conditioned at 25 deg C. and 50% RH for a week before cutting and testing.

TABLE 4

| | Example | | | | | |
|---|---|---|---|---|---|---|
| | F (Comparative) | G (Comparative) | 14 | 15 | 16 | 17 |
| Composition (weight parts) | | | | | | |
| VORANOL CP 3322 | 100 | 100 | 100 | 100 | 100 | 100 |
| Water | 3.5 | 3.5 | 3.5 | 3.5 | 3.5 | 3.5 |
| NIAX A-1 | 0.05 | 0.05 | 0.05 | 0.05 | 0.05 | 0.05 |
| DABCO 33LV | 0.15 | 0.15 | 0.15 | 0.15 | 0.15 | 0.15 |
| KOSMOS 29 | 0.10 | 0.2 | 0.2 | 0.2 | 0.15 | 0.10 |
| TEGOSTAB B-2370 | 1.2 | 1.2 | 1.2 | 1.2 | 1.2 | 1.2 |
| Redispersible Powder of Example | — | — | 2.0 of Ex. 8 | 2.0 of Ex. 9 | 2.0 of Ex. 12 | 2.0 of Ex. 13 |
| VORANATE T-80 index | 107 | 107 | 107 | 107 | 107 | 107 |
| Properties | | | | | | |
| Comment on foam | Internal Void | Good | Good | Good | Good | Good |
| Core density (Kg/m3) | Not applicable, NA | 30.0 | 31.1 | 33.2 | 33.6 | 34 |
| 50% CFD (KPa) | NA | 4.7 | 3.1 | 3.4 | 3.4 | 3.4 |
| Airflow in cf/min. | NA | 2.6 | 0.02 | 0.7 | 1.0 | 0.9 |
| (in m3/min.) | NA | (0.006) | (0.00005) | (0.00016) | (0.00023) | (0.00021) |
| Resiliency (%) | NA | 42 | 38 | 36 | 38 | 39 |

Use of the Water-Redispersible Polymer Powder in the Production of a Polyurethane Foam A description of the raw materials used in the examples is as follows.

| | |
|---|---|
| VORANOL CP 3322 | is a triol polyol available from The Dow Chemical Company. |
| NIAX A-1 | is a tertiary amine catalyst available from Momentive Performance Materials. |
| DABCO 33 LV | is a tertiary amine catalyst available from Air Products and Chemicals Inc. |
| KOSMOS 29 | is Stannous Octoate available from Evonik Industries |
| TEGOSTAB B-2370 | is a silicone based surfactant available from Evonik Industries. |
| VORANATE T-80 | is an 80/20 mixture of 2,4- and 2,6- toluene diisocyanate available from The Dow Chemical Company. |

All foam properties listed in Table 4 below are tested according to ASTM D-3574-95 test method unless otherwise reported. Airflow is in cfm (cubic foot per minute) or cubic meter per minute. Compression Force Deflection (CFD) measures the load bearing ability of the foam.

All foams of the present invention have a nice cell structure. The examples in Table 4 illustrate that incorporation of the water redispersible polymer powder of the present invention in a polyurethane formulation has a softening effect on the polyurethane foam produced from such formulation. Resiliency values are good considering that these foams are tight, i.e. have low airflow values. The examples in Table 4 further illustrate that the water redispersible polymer powders of the present invention can act as co-catalysts. The control foam without water redispersible polymer powder and containing the same level of catalyst (0.10 parts of stannous octoate commercially available as KOSMOS 29) shows internal voids by lack of proper gelation.

Use of the Water-Redispersible Polymer Powder in Cement-Based Tile Adhesives

Three different cement-based tile adhesive compositions are prepared by dry blending the solid components indicated in Table 5 below and then adding water. Various properties of the tile adhesives being essential for their performance are tested and the results are also shown in Table 5.

Test Methods

Initial strength, strength after water immersion and strength after heat aging are measured according to European standard EN 1348. The tile adhesive is applied onto concrete slabs and non absorbent ceramic tiles (Winckelmann, 50 to 50 mm) are stocked onto the tile adhesive to measure the pull of strength after being stored under different conditions: initial strength at room temperature (14 days), strength after water immersion (7 days standard climate+7 days water immersion) and strength after heat storage (7 days standard climate+7 days at 70° C.).

Strength after 20 min open time is measured according to European standard EN 1346. The tile adhesive is applied onto a concrete slab and after a certain "open time" of 20 min ceramic absorbent tiles are stocked onto the tile adhesive to measure the strength after being stored for 14 days.

Force and Deformation are measured according to the EN 12002. Samples of at least 2 kg of the adhesive are prepared according to European standard EN 1066. All test materials are conditioned for at least 24 h under standard conditions (23+/−2° C. and 50+/−5% room humidity). The samples are placed into polyethylene bags for 14 days and let conditioned for extra 14 days. The samples are deformed by applying a transverse force, by moving a Toni machine, at a rate of 2 mm/min until the first crack is observed in the lower surface. At this point the force is recorded in Newton and the deformation in mm.

Rib deformation: The sliding test is performed as described above. When the test is completed and the sliding has been measured, the tile is pulled off by hand (as straight as possible). The percentage of the tile covered with material from the test is then judged by eye and noted.

Consistency: The consistencies are obtained with a Brookfield viscometer in combination with a Brookfield Helipath stand. After a maturing time of 13 min the tile adhesive is filled into a cup and the spindle (F-T) of the viscometer rotates for 2 minutes with 0.5 rpm, for another 2 minutes with 5 rpm and another 2 minutes with 50 rpm. During the 5 rpm and 50 rpm rotation the viscometer is moved up and down so that its rotating spindle describes a helical path through the sample. The consistencies (dynamic viscosities) at 0.5 rpm, 5 rpm and 50 rpm are listed in Table 5.

Workability: Workability is evaluated subjectively and rated on a scale from 1 (very poor) to 5 (very good).

TABLE 5

Compositions and properties of cement-based tile adhesives

| | | Example | | |
|---|---|---|---|---|
| | | 18 | 19 | 20 |
| Redispersible Powder of | | Example 8 | Example 10 | Example 12 |
| Composition | | | | |
| Jura Cement 42.5 | pbw | 40.00 | 40.00 | 40.00 |
| Quartz sand 0.1-0.3 mm | pbw | 60.00 | 60.00 | 60.00 |
| Cellulose Ether* | pbw | 0.40 | 0.40 | 0.40 |
| Redispersible Powder | pbw | 2.5 | 2.5 | 2.5 |
| Total | pbw | 102.9 | 102.9 | 102.9 |
| Water | pbw | 23.0 | 23.0 | 23.0 |

TABLE 5-continued

Compositions and properties of cement-based tile adhesives

| | | Example | | |
|---|---|---|---|---|
| | | 18 | 19 | 20 |
| Properties | | | | |
| Initial Strength (14 d RT) | N/mm2 | 1.68 | 1.76 | 1.88 |
| 20' Open time (14 d RT) | N/mm2 | 1.20 | 1.32 | 1.54 |
| Water immersion (14 d) | N/mm2 | 0.97 | 1.26 | 1.34 |
| Heat aging (14 d) | N/mm2 | 1.25 | 1.68 | 1.78 |
| Force | N | 6.26 | 8.38 | 8.09 |
| Deformation | mm | 1.81 | 2.09 | 2.00 |
| Rib deformation | % | 90 | 100 | 100 |
| Density | Kg/l | 1.49 | 1.53 | 1.51 |
| Workability | Rating | 5 | 5 | 5 |
| Consistency 0.5 rpm | cps*1000 | 2735 | 2657 | 2423 |
| Consistency 5 rpm | cps*1000 | 447 | 487 | 425 |
| Consistency 50 rpm | cps*1000 | 84 | 89 | 82 |

*Hydroxypropyl methyl cellulose (Methocel 10-0148, available from The Dow Chemical Company, Midland, USA)

Use of the Water-Redispersible Polymer Powder in External Thermal Insulating Systems (ETICS)

6 different water-redispersible polymer powder compositions are prepared by dry blending the solid components indicated in Table 6 below and then adding water. Various properties of the compositions being essential for their performance in external thermal insulating systems, such as water uptake and impact resistance, are tested and the results are also shown in Table 6. The compositions are used for coating insulation boards as described in ETAG 004. ETAG 004 is the guideline drawn up by the EOTA (European Organization for Technical Approvals) working group on external thermal insulation composite systems (ETICS).

Test Methods

All tests are done according to ETAG 004.

Consistency: The consistencies are measured with a Brookfield viscometer in combination with a Brookfield Helipath stand. After a maturing time of 13 min the composition is filled into a cup and the spindle (F-T) of the viscometer rotates for 2 minutes with 0.5 rpm, for another 2 minutes with 5 rpm and another 2 minutes with 50 rpm. During the 5 rpm and 50 rpm rotation the viscometer is moved up and down so that its rotating spindle describes a helical path through the sample. The consistencies (dynamic viscosities) at 0.5 rpm, 5 rpm and 50 rpm are given in Table 6.

Water uptake: The water uptake is weighed after 24 hours in kg/m2.

Impact Resistance Hard body impact measurement (3 joules) is carried out with a steel ball weighing 1 kg and from a height of 0.61 m. The damage on the coated insulation board is rated on scale from 1 (very poor) to 5 (very good). The test methods as well as dimension of board and the thickness of the coating are described in the ETAG 004.

TABLE 6

Composition and Properties of Portland Compositions for External Thermal Insulating Systems

| | | Example 21 | Example 22 | Example 23 | Example 24 | Example 25 | Example 26 |
|---|---|---|---|---|---|---|---|
| Redispersible Powder of Composition | | Example 8 | Example 9 | Example 10 | Example 11 | Example 12 | Example 13 |
| [1]Cement | pbw | 35.00 | 35.00 | 35.00 | 35.00 | 35.00 | 35.00 |
| Quartz sand 0.1-0.45 mm | pbw | 60.00 | 60.00 | 60.00 | 60.00 | 60.00 | 60.00 |
| [2]Cellulose Ether | pbw | 0.12 | 0.12 | 0.12 | 0.12 | 0.12 | 0.12 |
| Redispersible Powder | pbw | 4.5 | 4.5 | 4.5 | 4.5 | 4.5 | 4.5 |
| Sodium Oleate | pbw | 0.5 | 0.5 | 0.5 | 0.5 | 0.5 | 0.5 |
| Total | pbw | 100.12 | 100.12 | 100.12 | 100.12 | 100.12 | 100.12 |
| Water | pbw | 22.0 | 22.0 | 22.0 | 22.0 | 22.0 | 22.0 |
| Properties | | | | | | | |
| Water uptake after 24 h | kg/m2 | 0.58 | 0.33 | 0.40 | 0.33 | 0.64 | 0.37 |
| Impact resistance, estimation (max = 5) | | 4.8 | 4.8 | 4.8 | 4.8 | 4.8 | 4.8 |
| Density | kg/l | 1.43 | 1.40 | 1.41 | 1.37 | 1.39 | 1.39 |
| Consistency 0.5 rpm | cps * 1000 | 5716 | 3959 | 4612 | 3432 | 3841 | 3494 |
| Consistency 5 rpm | cps * 1000 | 727 | 476 | 641 | 528 | 553 | 432 |
| Consistency 50 rpm | cps * 1000 | 63 | 58 | 69 | 62 | 57 | 53 |

[1]Portland cement NORMO 4, 42, 5
[2]Hydroxypropyl methyl cellulose (commercially available from The Dow Chemical Company, Midland, USA under the Trademark METHOCEL F75M)

What is claimed is:

1. A water-redispersible polymer powder comprising in copolymerized form
   a) one or more vinyl aromatic comonomers,
   b) one or more 1,3-diene comonomers,
   c) from 0.1 to 15 percent, based on the total comonomer weight, of one or more comonomers selected from the group consisting of ethylenically unsaturated mono- and dicarboxylic acids and their salts, wherein at least 75 percent of the total number of carboxylic acid and salt groups present in the polymer are located at the surface of the polymer particles in the powder and at least 75 percent of the carboxylic acid and salt groups located at the surface of the polymer particles in the powder are present in their salt form having a cation, and
   d) from 0 to 40 percent, based on the total comonomer weight, of one or more additional comonomers; and
the redispersible polymer powder further comprising a partially hydrolyzed polyvinyl alcohol.

2. The water-redispersible polymer powder of claim 1 wherein at least 85 percent of the total number of carboxylic acid and salt groups present in the polymer are located at the surface of the polymer particles in the powder.

3. The water-redispersible polymer powder of claim 1 wherein at least 85 percent of the carboxylic acid and salt groups located at the surface of the polymer particles in the powder are present in their salt form.

4. The water-redispersible-polymer powder as claimed in claim 1, wherein the one or more comonomer c) is selected from the group consisting of itaconic acid, fumaric acid, their salts and combinations thereof.

5. The water-redispersible-polymer powder as claimed in claim 1, wherein the cation in the carboxylic acid salt groups is ammonium, an alkali metal ion or an alkaline earth metal ion.

6. The water-redispersible-polymer powder as claimed in claim 5, wherein the cation in the carboxylic acid salt groups is the alkali metal ion sodium or potassium or the alkaline earth metal ion calcium or magnesium.

* * * * *